Patented Apr. 18, 1939

2,155,027

UNITED STATES PATENT OFFICE 2,155,027

PROCESS OF TREATING ACID LIQUORS

Anton Johan Tulleners, Amsterdam, Netherlands, assignor to Shell Development Company, San Francisco, Calif., a corporation of Delaware No Drawing. Application December 6, 1937, Serial No. 178,350. In the Netherlands December 24, 1936

11 Claims. (Cl. 260—460)

This invention relates to the manufacture of acid alkyl esters and deals with a process for selectively separating free acid from mixtures containing free acid and such esters which mixtures are commonly referred to as "acid liquors". It is especially concerned with a process for treating acid alkyl ester-containing absorption products of olefines in acids whereby the excess acid present may be substantially completely separated in a simple manner without loss of acid esters.

In United States Patent 2,078,516 I have described and claimed a process for effecting the separations here under consideration by the addition of carefully controlled, small amounts of water which cause separation of an aqueous phase containing a part of the free acid content of the acid liquor. This procedure has two disadvantages, first the amount of water added must be accurately regulated in order to obtain a satisfactory phase separation and second quantitative acid removal is impractical without serious loss of acid alkyl esters. The present invention is an improvement on this process which completely eliminates these disadvantages.

My invention may be practiced with any suitable absorption product of an olefine or olefines of five or more carbon atoms per molecule in acid regardless of its source or olefine content. For the purpose of affording a clear understanding of the invention, but without imposing limitation thereon, it will be described with more particular reference to the treatment of acid liquors prepared by absorbing amylenes or higher olefines in sulfuric acid. However, it will be understood that acid liquors of other types and/or sources may be similarly treated. Thus, for example, not only may acid liquors produced by sulfation of monohydric alcohols corresponding to such olefines be used, but also other polybasic acids such as, for example, phosphoric acid may be employed in preparing the acid liquor to be treated.

My improved process for selectively separating the free acid from the acid alkyl ester content of acid liquors essentially comprises treatment with two solvents of limited mutual miscibility, more particularly an aqueous solvent for the free acid to be removed and an organic oxygen-containing solvent for the acid alkyl esters to be purified. I have found that exacting control may be eliminated and practically quantitative removal of acid effected without loss of acid alkyl esters or risk of emulsification by extracting the acid liquor with a suitable aqueous medium in the presence of an oxygen-containing organic compound with at least five and at most about fifteen carbon atoms per molecule.

Examples of such oxygen-containing organic compounds, for brevity's sake referred to hereinafter as "solvents", are the aliphatic monohydric alcohols, either primary, secondary or tertiary, such as hexyl alcohol, heptyl alcohol, decyl alcohol, 4-methyl-pentanol-2, isobutyl dimethyl carbinol, cyclohexanol, and the like, benzyl alcohol, terpene alcohols, such as terpineol, aliphatic or aromatic ketones, such as methyl hexyl ketone, methyl heptyl ketone, methyl isobutyl ketone, ethyl cyclohexyl ketone, mesityl oxide, benzophenone, etc., ethers of which di-isopropyl, methyl-cyclohexyl, anisol, diethylene glycol monoethyl ether and the like are typical, esters including n-butyl acetate, ethyl butyrate, methyl benzoate, benzyl acetate, and the like as well as suitable substitution products of such organic oxy compounds of 5 to 15 carbon atoms per molecule.

Also mixtures of these solvents with other solvents, such as those with less than five carbon atoms, may come into consideration under certain circumstances, such as a mixture of nonyl alcohol and methyl ethyl ketone. Instead of the chemical individuals, technical mixtures of oxygen-containing solvents may be used, such for example as the mixtures of higher primary and secondary alcohols obtainable by hydrogenation of carbon oxides, or of the secondary and tertiary alcohols obtainable by absorption of olefines of six or more carbon atoms in sulfuric acid and hydrolysis of the resulting absorption products, or the mixed higher alcohols obtainable by controlled oxidation of paraffin hydrocarbons, or mixtures of cyclic hydroxy compounds, such, for example, as the mixed phenols obtainable from the soda sludge of cracked petroleum distillates and the like, or the mixtures of cyclic alcohols obtainable by hydrogenation of such mixed phenols. Ketone or ester mixtures such as are obtainable by dehydrogenation or oxidation or by esterification of such alcohol mixtures comprise another technically available source of acid alkyl ester solvents for use in the process of my invention.

Suitable aqueous media for effecting the selective removal of free acid from acid liquors include, in addition to water itself, water to which a little alcohol or ether has been added, aqueous salt solutions such as brine, sodium sulfate solutions, and the like, or aqueous alkaline solutions or dilute aqueous acid solutions. A salt solution is preferably applied only in the case of sulfuric acid esters derived from unsaturated hydrocarbons with less than approximately ten carbon atoms in the molecule.

The upper limit of approximately fifteen carbon atoms in the organic oxy solvent is determined by the degree of solubility of the sulfuric acid esters in these solvents, which should be sufficient for carrying out the present process. The solubility, in fact, decreases according as the number of carbon atoms of the solvent increases, the limit of serviceableness lying in the neighborhood of fifteen carbon atoms. The lower limit of five carbon atoms is determined by the solubility of the solvents in water. Solvents with less than five carbon atoms generally have too high a solubility in water to be sufficiently effective for the present process.

The process according to the invention is illustrated by the following examples:

Example I

A reaction mixture was prepared by treating 750 parts by weight of a cracking distillate boiling between 220 and 310° C., obtained by cracking solid paraffin wax in the vapor phase and having a bromine figure McIlhiney=50.2, with twice the molecular quantity, calculated on the bromine figure, of sulfuric acid of 90% concentration for 1 hour at 0–5° C. while stirring vigorously.

After this treatment 750 parts by weight of secondary heptyl alcohol was added to the reaction product, the temperature being kept below 25° C. by cooling.

This mixture was subsequently washed 5 times in succession with in all 700 parts by weight of water, after which 99.6% of the free sulfuric acid present was found to have been removed.

The practically sulfuric acid-free solution of the sulfation product may—when, for example, it is the intention to prepare sodium alkyl sulfates—be worked up further as follows, in which case the heptyl alcohol need not first be removed.

The solution is treated in the heat with such a quantity of alkali hydroxide solution as to ensure neutralization of the acid esters and saponification of the neutral esters (dialkyl sulfates). This presents the advantage that especially the saponification proceeds more smoothly than would be the case in the absence of heptyl alcohol.

The mixture obtained is then diluted with double the quantity of water, after which an extraction with washing benzine is carried out.

The heptyl alcohol, unconverted benzine and impurities (so-called polymers) then pass into the extract, whilst the raffinate consists of a pure aqueous solution of sodium alkyl sulfates, from which the latter are obtainable in a completely pure state by evaporation.

The heptyl alcohol may be recovered from the washing benzine extract by distillation.

Example II

A reaction mixture was prepared by treating 100 parts by weight of a cracking distillate boiling between 160 and 310° C., containing olefines with 10 to 18 carbon atoms in the molecule and having a bromine figure McIlhiney=69.5 (which cracking distillate was obtained by vapor phase cracking of solid paraffin wax) with twice the molecular quantity, calculated on the bromine figure, of sulfuric acid of 90% concentration for 1 hour at about 5° C.

After the sulfation reaction 100 parts by weight of secondary heptyl alcohol was added to the reaction product, the temperature being kept at about 10° C. by cooling.

This mixture was subsequently washed 7 times in succession, each time with 15 parts by weight of water, as a result of which practically all the free sulfuric acid present was found to have been removed.

The solution of the sulfation product, substantially free of sulfuric acid, was then worked up as follows for the preparation of calcium alkyl sulfates:

The solution was heated with 110% of the amount of 35% milk of lime required for the neutralization of the acid alkyl esters and the saponification of the neutral esters.

From the resulting reaction product, after addition of 200 parts of 95% ethanol and 150 parts by weight of washing benzine, the excess of calcium hydroxide and the small amounts of calcium carbonate, calcium sulfate and the like, present could be removed by filtration at about 50° C. The filtration residue amounted to about 2 parts by weight. The filtrate was then extracted with washing benzine to remove the uncovered hydrocarbons and the heptyl alcohol. After preliminary evaporation of the ethanol and the washing benzine a concentrated solution of calcium alkyl sulfates is obtainable from the extracted solution by evaporation.

The application of heptyl alcohol presents the advantage that the treatment with milk of lime can be carried out more smoothly, the resulting product, in the absence of the higher molecular alcohol, being inconveniently viscous, and the saponification proceeding slowly owing to a bad contact. Further it presents the advantage that only small amounts of solid substances are to be filtered off, so that little alkyl sulfate is lost in the filter cake or has to be washed out.

Example III

A reaction mixture was prepared in the manner described in Example I, 500 parts by weight cracking distillate being taken as initial material.

The reaction product was washed with 67.5 parts by weight water, whereby 91.7% of the unconverted sulfuric acid present could be removed.

To the washed product was added 500 parts heptyl alcohol, after which a washing was effected with 250 parts by weight water, a product being thereby obtained from which 99.6% of the free sulfuric acid originally present was removed.

After the reaction mixture has been washed out with water and before having this treatment followed by a washing according to Example III after addition of a solvent according to the invention, the so-called polymers and the dialkyl sulfates may, if desired, first be removed by extraction (for example with washing benzine) after dilution with, say, double the quantity of water. Subsequently, when adding the solvent, a separation into two layers is obtained, the upper layer consisting of a solution of the acid alkyl sulfate in the solvent. Sometimes this solution is directly acid-free, but if this is not the case, it can be rewashed with water for this purpose.

My improved procedure may thus be used in place of, or more advantageously, in conjunction with the method described in my patent previously referred to. In either case it may be carried out by batch, intermittent or continuous methods of operation. One suitable continuous method of operation, for example, comprises continuously adding the organic solvent to the acid liquor to be treated and contacting the mixture with water in countercurrent. One may also proceed in such a manner that the sulfation product is introduced into an extraction column at a suitable place between top and bottom, then wash water is introduced at the top and the solvent at the bottom, and that at the bottom of the column a sulfuric acid solution is drawn off and at the top a sulfuric acid-free mixture of sulfation product and solvent.

It will be apparent that the two-solvent extraction process of my invention offers many advantages, particularly in efficiency and completeness of separation of free acid from acid alkyl esters and consequently in freedom from losses compared with prior methods. The completeness of the separation of the free acid not only leads to higher yields of acid alkyl esters of higher purity but also to a material saving in reagents particularly the excess sulfuric acid which may be reused by simple concentration and the neutralizing agents formerly required for reaction with the acid left in the esters. As an additional advantage may be mentioned the fact that possible coloring constituents present are removed from the sulfation products together with the sulfuric acid, so that these coloring constituents can no longer impart an undesirable appearance to the reaction products of said sulfation products. Finally the presence of free sulfuric acid in the acid alkyl sulfates adversely affects the results obtained in some processes for working up said products; thus, for example, when alkali-alkyl sulfates have to be prepared, products are obtained containing alkali sulfate, which can only be removed therefrom with great difficulty, so that also for this reason it is important that a process has been found allowing of a practically complete removal of the excess sulfuric acid.

My invention is not only capable of wide variation with respect to the inorganic acids and acid alkyl esters which may be separated and the two solvents which may be used, but also the operating details may be greatly varied. For example, it will be evident that centrifugal separation may be used for separating the aqueous free acid extracting medium from the oxygenated organic solvent solution of the acid alkyl ester being purified instead of the stratification and decantation methods used in the foregoing examples, and that centrifugal pumps, paddle agitated mixing drums or other suitable contacting devices may be used in carrying out the two-solvent extraction. Furthermore, it will be clear that instead of the alcohols, ketones, etc., described as suitable solvents for the acid alkyl esters, other oxygenated organic solvents of five to fifteen carbon atoms, such, for example, as aldehydes, carboxylic acids, phenols and the like, may be used. Similarly, while the invention has been described with more particular reference to the purification of acid alkyl esters having five or more carbon atoms in the alkyl group it will be apparent that the corresponding cyclic esters such, for example, as cyclopentyl acid sulfate and the like may be similarly treated. It will therefore be clear that my invention is not to be limited to the details of operation described nor by any theory advanced in explanation of the improved results attained, but only by the terms of the accompanying claims in which it is my intention to claim all novelty inherent therein as broadly as possible in view of the prior art.

I claim as my invention:

1. The process of treating absorption products of olefines of at least five carbon atoms per molecule in strong polybasic mineral acids, which comprises adding to the absorption product a normally liquid substantially water insoluble oxygen-containing organic compound having at least five and not more than fifteen carbon atoms per molecule which is a solvent for the acid alkyl ester content thereof and an aqueous solvent for the free acid present therein and separating the resulting phases.

2. The process of treating absorption products of olefines of at least five carbon atoms per molecule in strong polybasic mineral acids, which comprises adding to the absorption product a normally liquid substantially water insoluble oxygen-containing organic compound having at least five and not more than fifteen carbon atoms per molecule which is a solvent for the acid alkyl ester content thereof and a small amount of an aqueous solvent for the free acid present therein to effect separation of a relatively concentrated acid solution, withdrawing the acid solution thus separated and extracting further free acid present in the remaining mixture by means of an aqueous solvent therefor.

3. The process of treating absorption products of olefines of at least five carbon atoms per molecule in strong polybasic mineral acids from which a part of the free acid content has been removed which comprises extracting the remaining free acid by means of an aqueous solvent therefor in the presence of a normally liquid substantially water insoluble oxygen-containing organic compound having at least five and not more than fifteen carbon atoms per molecule which is a solvent for the acid alkyl ester content of the absorption product.

4. The process of treating mixtures containing free strong polybasic mineral acid and acid alkyl esters of said acid, the alkyl radical of which contains at least five carbon atoms, which comprises subjecting the mixture to the action of countercurrent flowing streams of a normally liquid substantially water insoluble oxygen-containing organic compound having at least five and not more than fifteen carbon atoms in the molecule which is a solvent for said acid alkyl ester and an aqueous solvent for said free acid which is substantially immiscible with the oxygen-containing organic solvent whereby an aqueous solution of the acid substantially free from acid alkyl ester and a solution of acid alkyl ester substantially free from said free mineral acid are separately removed.

5. The process of treating a reaction product of an aliphatic monohydric alcohol containing at least five carbon atoms per molecule with an excess of a strong polybasic mineral acid of the class consisting of sulfuric and phosphoric acids which comprises selectively extracting free acid therefrom with an aqueous solvent for said acid in the presence of sufficient of a normally liquid substantially water insoluble oxygen-containing organic compound of the class consisting of carboxylic and hydroxy compounds having at least 5 and not more than 15 carbon atoms per molecule to retain the acid alkyl ester content present in the non-aqueous phase.

6. The process of treating absorption products of secondary olefines of at least 5 carbon atoms per molecule in sulfuric acid which contain free sulfuric acid and acid alkyl sulfates which comprises selectively removing free sulfuric acid therefrom by extraction with an aqueous solvent for sulfuric acid in the presence of a normally liquid substantially water insoluble oxygen-containing organic compound of the class consisting of carboxylic and hydroxy compounds having at least 5 and not more than 15 carbon atoms per molecule.

7. The process of treating absorption products of secondary olefines of at least 5 carbon atoms per molecule in sulfuric acid which contain free sulfuric acid and acid alkyl sulfates which comprises adding to the absorption product a normally liquid substantially water insoluble oxygen-containing organic compound of the class consisting of carboxylic and hydroxy compounds having at least 5 and not more than 15 carbon atoms per molecule and water washing the resulting mixture.

8. The process of treating absorption products of olefines of at least five carbon atoms per molecule in strong polybasic mineral acids, which comprises adding to the absorption product a substantially water insoluble normally liquid organic hydroxy compound having at least five and not more than fifteen carbon atoms per molecule which is a solvent for the acid alkyl ester content thereof and an aqueous solvent for the free acid present therein and separating the resulting phases.

9. The process of treating absorption products of olefines of at least five carbon atoms per molecule in strong polybasic mineral acids, which comprises adding to the absorption product a monohydric alcohol having at least five and not more than fifteen carbon atoms per molecule which is a solvent for the acid alkyl ester content thereof and an aqueous solvent for the free acid present therein and separating the resulting phases.

10. The process of treating absorption products of olefines of at least five carbon atoms per molecule in strong polybasic mineral acids, which comprises adding to the absorption product a heptylalcohol and an aqueous solvent for the free acid present and separating the resulting phases.

11. The process of treating absorption products of olefines of at least five carbon atoms per molecule in strong polybasic mineral acids, which comprises adding to the absorption product a ketone having at least five and not more than fifteen carbon atoms per molecule which is a solvent for the acid alkyl ester content thereof and an aqueous solvent for the free acid present therein and separating the resulting phases.

ANTON JOHAN TULLENERS.